US010021834B2

(12) United States Patent
Rosseel et al.

(10) Patent No.: US 10,021,834 B2
(45) Date of Patent: Jul. 17, 2018

(54) PLUNGER SLOT CLEANER FOR AN AGRICULTURAL BALER

(71) Applicant: CNH Industrial America LLC, New Holland, PA (US)

(72) Inventors: Bram Rosseel, Snellegem (BE); Thomas Vandaele, Zedelgem (BE); Jeroen Devroe, Izegem (BE); Dieter Kindt, Vladslo (BE); Jeng Mooren, Reninge (BE); Michiel Haezebrouck, Zuidschote (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/724,707

(22) Filed: Oct. 4, 2017

(65) Prior Publication Data

US 2018/0098503 A1 Apr. 12, 2018

(30) Foreign Application Priority Data

Oct. 7, 2016 (BE) .................................. 2016/5751

(51) Int. Cl.
*A01F 15/04* (2006.01)
*A01F 15/10* (2006.01)
*A01F 15/14* (2006.01)

(52) U.S. Cl.
CPC ............ *A01F 15/042* (2013.01); *A01F 15/10* (2013.01); *A01F 15/141* (2013.01); *A01F 2015/102* (2013.01)

(58) Field of Classification Search
CPC ...... A01F 15/10; A01F 15/101; A01F 15/042; A01F 15/0825; A01F 2015/102; A01F 2015/103; A01F 15/12; A01F 15/141; A01D 89/00; A01D 89/001
USPC ............................................. 100/8, 19 R, 179
See application file for complete search history.

(56) References Cited

U.S. PATENT DOCUMENTS

| 4,106,268 | A |   | 8/1978 | White et al. |
| 4,310,036 | A | * | 1/1982 | Rasmussen ............. A01F 25/14 |
|           |   |   |        | 100/112 |
| 4,372,104 | A |   | 2/1983 | Simonis et al. |
| 4,525,991 | A |   | 7/1985 | Naaktgeboren |
| 4,604,858 | A |   | 8/1986 | Esau et al. |
| 4,829,756 | A |   | 5/1989 | Schrag et al. |

(Continued)

FOREIGN PATENT DOCUMENTS

| DE | 19913030 A1 | 9/2000 |
| EP | 1340421 A1 | 9/2003 |

(Continued)

*Primary Examiner* — Jimmy T Nguyen
(74) *Attorney, Agent, or Firm* — Peter K. Zacharias; Patrick M. Sheldrake

(57) ABSTRACT

An agricultural baler includes a pre-compression chamber having an outlet, and a main bale chamber adapted to receive crop from the pre-compression chamber. A plunger is reciprocally disposed within the main bale chamber, and includes a plurality of plunger slots which are structured and arranged to allow a plurality of needles to intermittently pass therethrough. The baler is characterized by a plunger cleaner which is structured and arranged to provide the dual functionality of: 1) cleaning the plunger slots, and 2) opening and closing the outlet of the pre-compression chamber.

15 Claims, 8 Drawing Sheets

(56) References Cited

U.S. PATENT DOCUMENTS

| | | | |
|---|---|---|---|
| 4,945,719 | A | 8/1990 | Schrag et al. |
| 5,456,075 | A | 10/1995 | Meijer |
| 6,425,234 | B1 | 7/2002 | Krone et al. |
| 8,561,532 | B2 | 10/2013 | Bergmann |
| 2003/0159421 | A1 | 8/2003 | Trelstad et al. |
| 2016/0192592 | A1* | 7/2016 | Dumarey .............. A01F 15/101 56/341 |

FOREIGN PATENT DOCUMENTS

| | | |
|---|---|---|
| EP | 1769674 A1 | 4/2007 |
| FR | 2691874 A1 | 12/1993 |

\* cited by examiner

PLUNGER SLOT CLEANER FOR AN AGRICULTURAL BALER

FIELD OF THE INVENTION

The present invention relates to agricultural balers, and, more particularly, to plunger configurations within such balers.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber. A conventional stuffer can include one or more stuffer forks, and each stuffer fork can include one of more stuffer tines. The tines can have a same shape and width, or a different shape and width. For example, the following manufacturers have these stuffer designs:

New Holland—1 fork, 6 tines;
Kuhn—1 fork, 7 tines;
Krone—5 forks, 7 tines.

The number of forks and tines can influence the final configuration of the baler.

On existing balers, the stuffer unit can include a trip mechanism which is used to detect the crop pressure in the pre-compression chamber. The trip mechanism is spring loaded, and the target crop pressure can be set by an operator. When the target crop pressure is reached, the trip mechanism is tripped and the stuffer unit transfers the wad of crop material to the main bale chamber.

In the main bale chamber, the plunger compresses the wad of crop material into flakes to form a bale and, at the same time, gradually advances the bale toward the outlet of the bale chamber. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed. The plunger includes a number of laterally spaced plunger slots that allow needles from under the bale chamber to transfer twine or the like to the knotters for use in tying off the bale. The plunger slots can become plugged with crop matter, and thus some type of passive cleaning structure is typically used to clean the slots as the plunger reciprocates back and forth.

What is needed in the art is an agricultural baler which effectively transfers crop within the baler.

SUMMARY OF THE INVENTION

The present invention provides an agricultural baler with a plunger cleaner which both cleans the plunger slots and intermittently closes the outlet of the pre-compression chamber.

The invention in one form is directed to an agricultural baler, including a pre-compression chamber having an outlet, and a main bale chamber adapted to receive crop from the pre-compression chamber. A plunger is reciprocally disposed within the main bale chamber, and includes a plurality of plunger slots which are structured and arranged to allow a plurality of needles to intermittently pass therethrough. The baler is characterized by a plunger cleaner which is structured and arranged to provide a dual functionality of: 1) cleaning the plunger slots, and 2) opening and closing the outlet of the pre-compression chamber.

In one embodiment, the plunger cleaner is movable between two orientations, including a first orientation wherein the plunger cleaner cleans the plunger slots and opens the outlet of the pre-compression chamber; and a second orientation wherein the plunger cleaner cleans the plunger slots and closes the outlet of the pre-compression chamber.

In another embodiment, the plunger cleaner is pivotally mounted adjacent to a floor of the main bale chamber adjacent to the pre-compression chamber outlet, with the plunger cleaner being pivotally movable between the first orientation and the second orientation.

In another embodiment, the plunger cleaner includes a plurality of cleaning elements mounted intermittently along an edge of the pre-compression chamber outlet.

In another embodiment, the cleaning elements are independently pivotally mounted to the floor of the main bale chamber, and movement of the plurality of cleaning elements is independent from each other.

In another embodiment, movement of the plunger within the main bale chamber causes movement of the plurality of cleaning elements between the first orientation and the second orientation, or vice versa.

In another embodiment, the plunger includes at least one roller positioned within each plunger slot, with each roller engaging a corresponding cleaning element upon reciprocating movement of the plunger, whereby the cleaning element is moved from the first orientation to the second orientation.

In another embodiment, a latch arrangement selectively latches the plunger cleaner in the second orientation.

In another embodiment, the latch arrangement can include a plurality of hooks arranged alongside of the pre-compression chamber, and each of the plurality of cleaning elements includes a mating surface which mates with a corresponding one of the plurality of hooks, wherein the plurality of hooks are movable between an unhooked position when the plurality of cleaning elements are in the first orientation, and a hooked position when the plurality of cleaning elements are in the second orientation.

An advantage of the present invention is that the plunger cleaner can provide multiple functionality for: 1) cleaning the plunger slots, 2) opening and closing the outlet of the pre-compression chamber; and 3) detecting the crop pressure in the pre-compression chamber for activating the stuffer unit.

Another advantages is that the cleaning elements of the plunger cleaner can be moved between the open and closed positions, and vice versa, either actively or passively.

Yet another advantage is that movement of the plunger can move the cleaning elements to the first orientation (open position) and/or the second orientation (closed position).

A further advantage is the straw hooks or dogs are no longer needed for closing the pre-compression chamber.

A still further advantage is that the cleaning elements can be used to detect a crop pressure in the pre-compression chamber, so that a pressure sensing trip mechanism of conventional design is no longer needed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
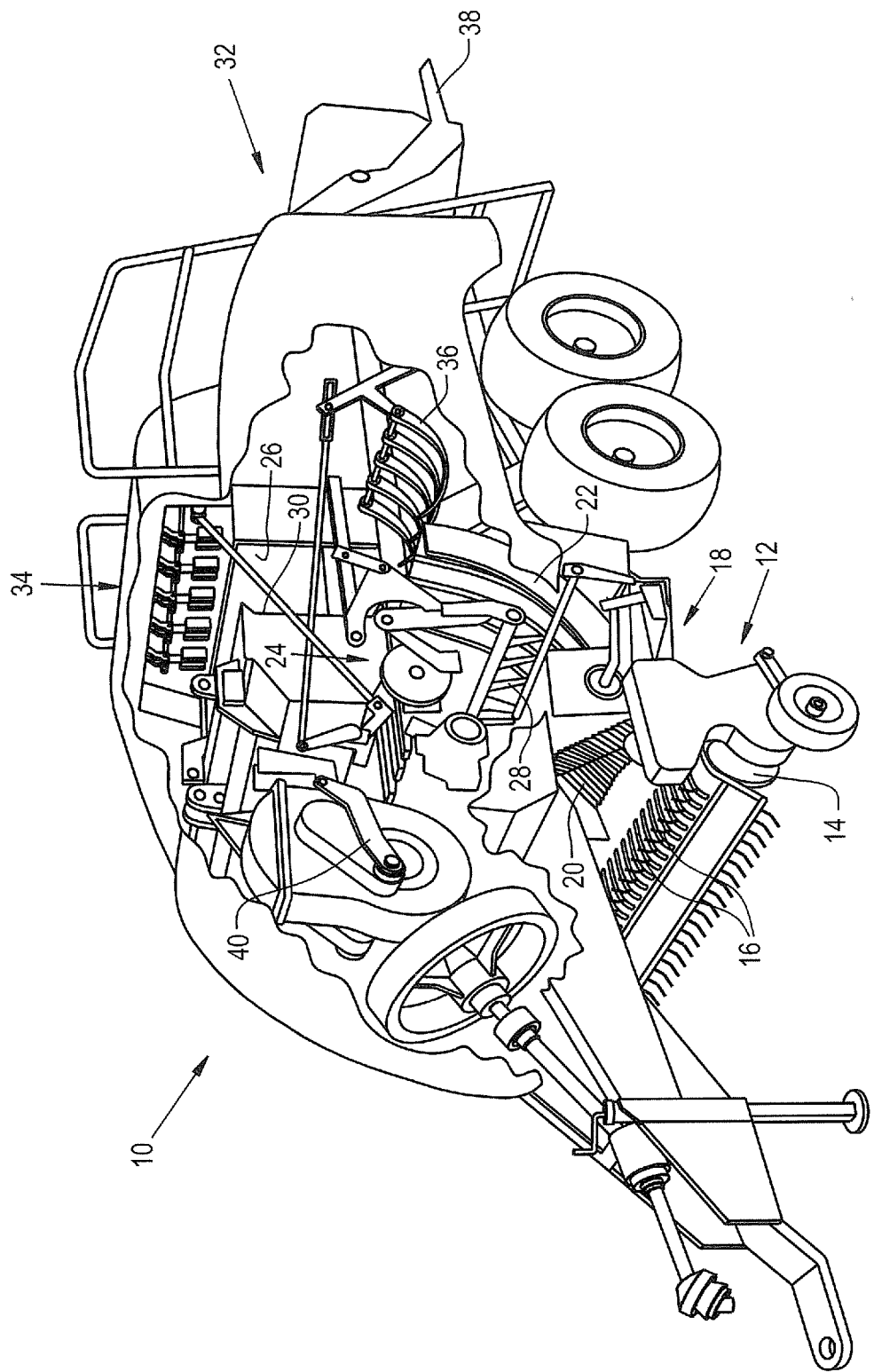
FIG. 1 is a perspective cutaway view showing the internal workings of a large square baler, which may include a plunger cleaner of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. A stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The needles 36 pass through a number of laterally spaced plunger slots 72 in the plunger 30 when the plunger 30 is at the rearward position at the end of the return stroke. The twine is cut and the formed bale is ejected from a discharge chute 38 as a new bale is formed.

During operation of baler 10, plunger 30 reciprocates back and forth during compression strokes within the main bale chamber 26. As the plunger 30 reciprocates back and forth, the plunger 30 travels between a rearward position when at the end of a return stroke and a forward position when at the end of a compression stroke. When the plunger 30 is at the rearward position, the exit of the pre-compression chamber 22 is open as shown in FIG. 2, and the front face of the plunger 30 is positioned to the rearward side of the exit of the pre-compression chamber, so that the pre-compressed crop material can be transferred into the main bale chamber 26.

Figure 2:
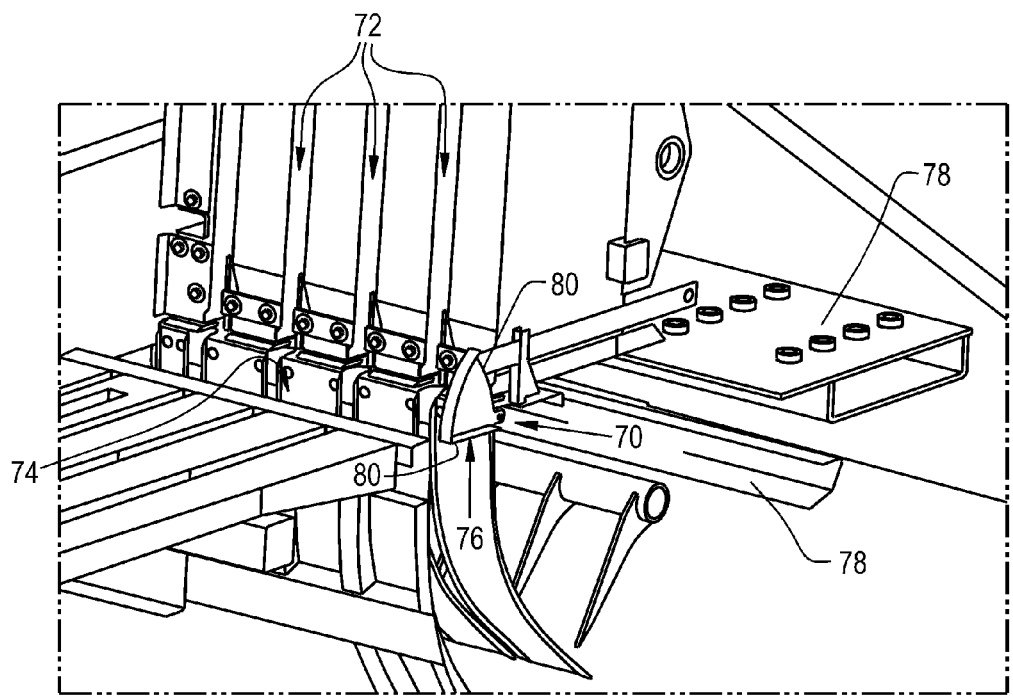
FIG. 2 is a perspective view of a portion of a large square baler, showing a portion of the main bale chamber, plunger, pre-compression chamber and part of an embodiment of a plunger cleaner of the present invention.

According to an aspect of the present invention, and referring to FIGS. 1 and 2 conjunctively, a plunger cleaner 70 of the present invention is shown which provides the dual functionality of: 1) cleaning the plunger slots 72, and 2) opening and closing the outlet 74 of the pre-compression chamber 22. The plunger cleaner 70 includes a number of laterally spaced cleaning elements 76, with each cleaning element 76 being positionable within a corresponding plunger slot 72 as the plunger 30 is moved toward the rearward position. In the illustration of FIG. 2, only a single cleaning element 76 is shown for clarity and brevity; however, it is to be understood that a plurality of cleaning elements 76 are intermittently spaced across and pivotally rotate relative to the bottom floor 78 of the main bale chamber 26. In this embodiment, each cleaning element 76 is individually and independently mounted to the floor 78. Each cleaning element 76 has a generally semi-circular shape, with the two adjoining straight-line edges 80 being at an angle of less than 90° relative to each other. Movement of the plunger 30 causes movement of the cleaning elements 76 between a first orientation in which the outlet 74 is open, and a second orientation in which the outlet 74 is closed (as shown in FIG. 2; discussed in greater detail below). Cleaning elements 76 clean the respective plunger slots 72 during both forward and rearward movement of the plunger 30, regardless of whether the cleaning elements 76 are in the first orientation or the second orientation.

According to another aspect of the invention, the plunger cleaner 70 can also provide an additional (third) functionality of providing crop pressure detection in the pre-compression chamber. For example, the plunger cleaner 70 can be spring loaded so that the cleaning elements 76 open only at a certain pressure or load of the crop on the plunger cleaner. The force required to open the cleaning elements can be preset and fixed, or can be adjustable.

Alternatively, the crop pressure or load can be measured with 1 or more load sensors. The force required for opening the cleaning elements can be measured on all cleaning elements 76 using load sensors associated with each respective cleaning element 76. The sensed loads represent the pressure within the pre-compression chamber.

The plunger cleaners can also be configured so that if they open, then they can activate or actuate another system on the baler. For example, when the plunger cleaners open, they can actuate the single revolution clutch that activates the stuffer. If sensors are used, the load value(s) obtained from the sensor(s) can also then be used to activate other systems onboard the baler 10 (e.g., used in the density routine of the main bale chamber). The load value can also represent the crop distribution in the pre-compression chamber.

Figure 3:
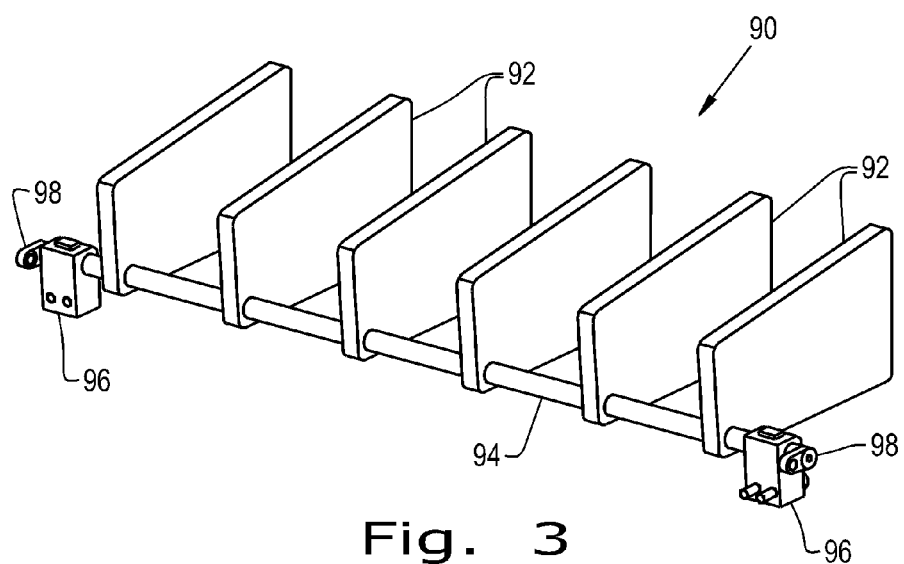
FIG. 3 is a perspective view of another embodiment of a plunger cleaner of the present invention.
Figure 4:
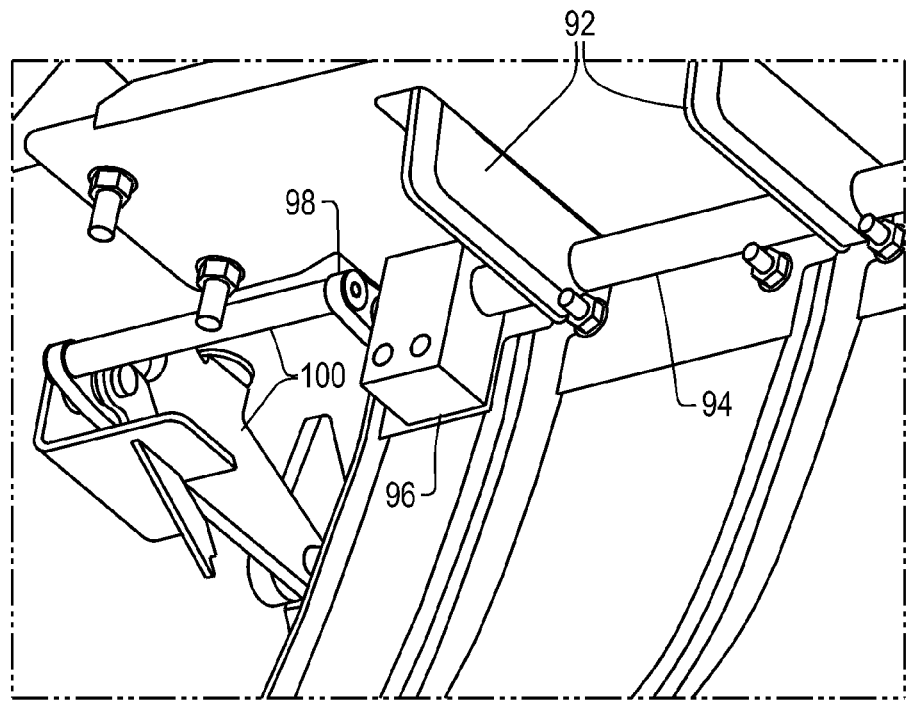
FIG. 4 is a bottom perspective view of a portion of the plunger cleaner shown in FIG. 3.
Figure 5:
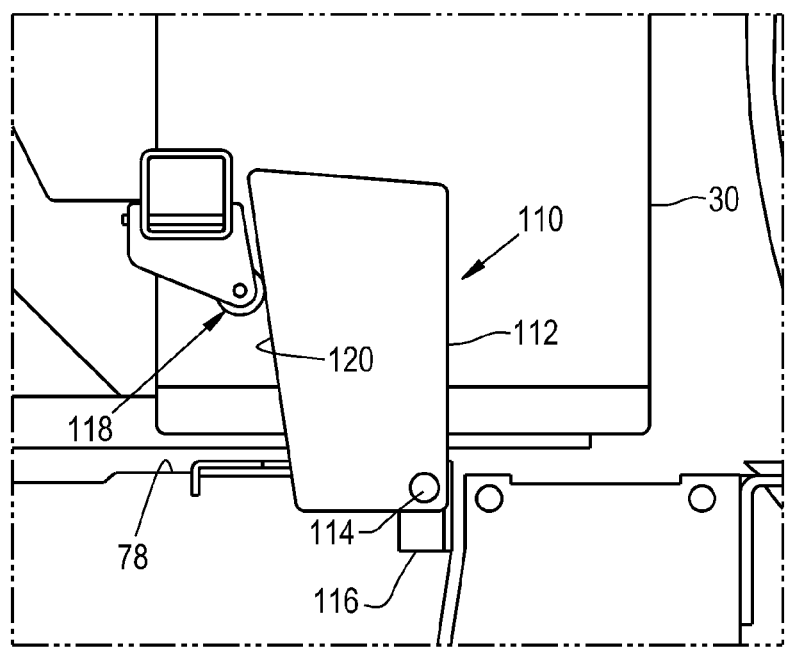
FIGS. 5 through 8 are partial side sectional views, taken through one of the plunger cleaner slots, showing sequentially how the plunger can move a cleaning element of the plunger cleaner from a first orientation (open position) to a second orientation (closed position)
Figure 6:
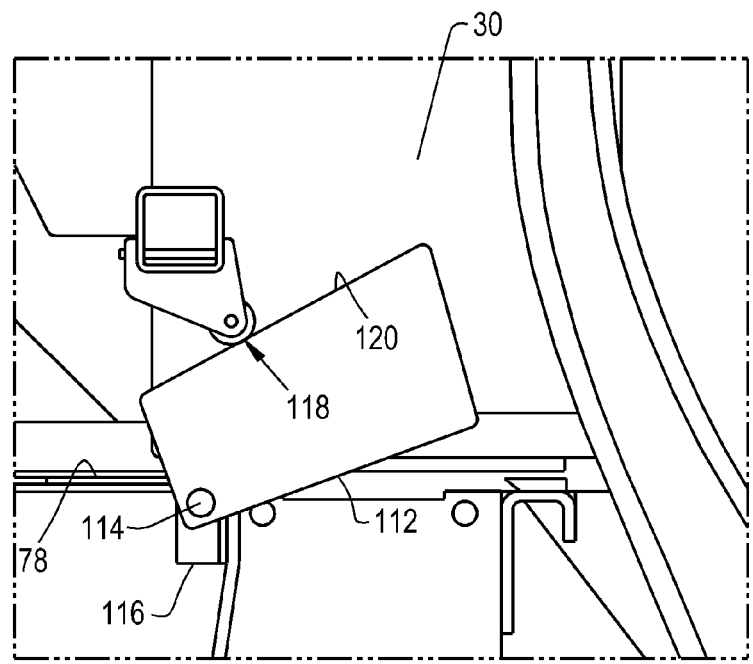
Figure 7:
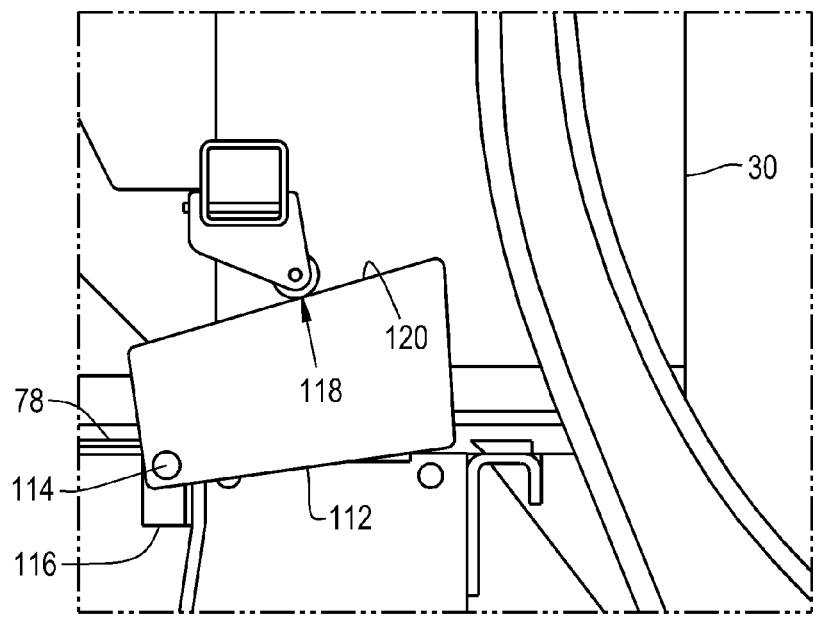
Figure 8:
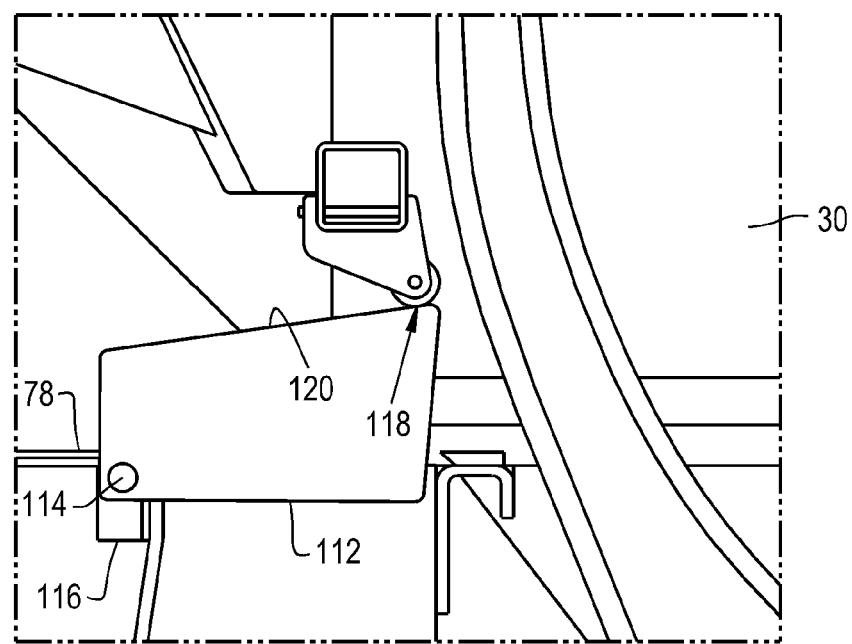

Referring now to FIGS. 3 and 4, there is shown another embodiment of a plunger cleaner 90 of the present invention which provides the dual functionality as described above with reference to plunger cleaner 70. Plunger cleaner 90 includes a plurality of generally trapezoidal shaped cleaning elements 92 which are substantially rigidly mounted to a common shaft 94. Each end of the shaft 94 is rotatably carried by a respective pair of bearings 96, which is mounted to the floor 78 or other suitable frame structure. Thus, rotation of the shaft 94 causes simultaneous movement of all of the cleaning elements 92. In the illustrated embodiment, each end of the shaft 94 extends through a corresponding bearing 96, and is rigidly attached to an ear 98. One of the ears 98 (or potentially both ears 98) are attached to suitable structure that moves the plunger cleaner between the open position and the closed position, or vice versa. In the embodiment shown, a suitable mechanism 100 is attached with the stuffer unit 24, so that cyclical movement of the stuffer 24 causes cyclical movement of the plunger cleaner 90. In this embodiment, the force required for opening the cleaning elements 92 can be measured relative to the common shaft 94 using load sensors associated with shaft 94.

Referring now to FIGS. 5 through 8, there is shown another embodiment of a plunger cleaner 110 of the present invention which provides the dual functionality as described above with reference to plunger cleaners 70 and 90. Similar to plunger cleaner 90, plunger cleaner 110 includes a plurality of generally trapezoidal shaped cleaning elements 112 which are substantially rigidly mounted to a common shaft 114. Each end of the shaft 114 likewise is rotatably carried by a respective pair of bearings 116. However, plunger cleaner 110 differs from plunger cleaner 90 in that the plunger cleaner 110 is passively moved between the open and closed positions (i.e., first and second orientations) by reciprocal movement of plunger 30, rather than active moved using an attached mechanism 100 or the like.

More particularly, shaft 114 is not attached to an ear at an end thereof. Instead, a roller arrangement 118 is positioned in each plunger slot 72. As the plunger 30 moves during the compression stroke, the roller arrangement 118 engages a surface 120 of the cleaning element 112. Each cleaning element 112 is moved from the open position (FIG. 5) to the closed position (FIG. 8) during the compression stroke with a respective roller arrangement 118. As the plunger 30 moves rearward during the return stroke, a spring assist (not specifically shown) or active assist (not specifically shown) can be used to move the cleaning elements 112 back to the open position. Alternatively, the movement of the wad of crop from the pre-compression chamber to the main bale chamber can be used to move the cleaning elements 112 back to the open position.

Figure 9:
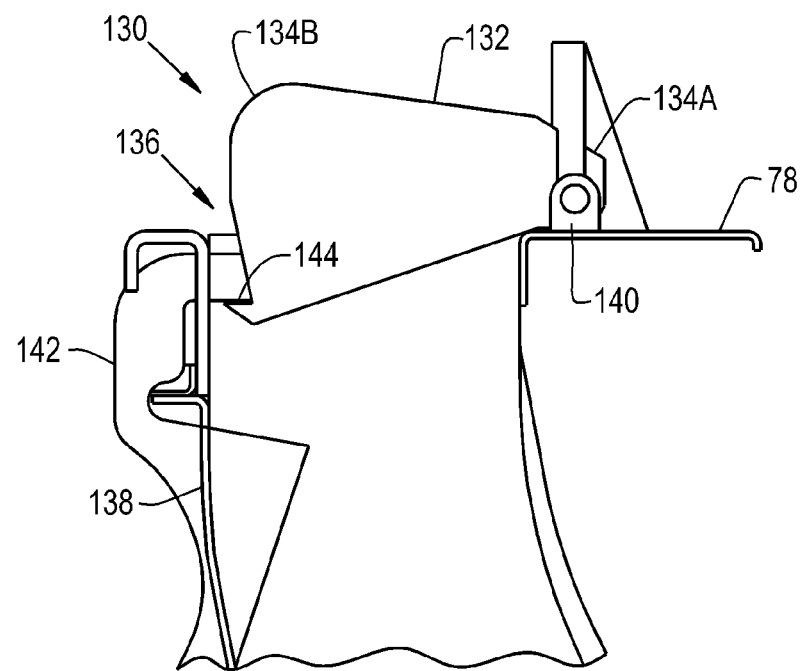
FIG. 9 is a partial side view illustrating another embodiment of a plunger cleaner of the present invention.
Figure 10:
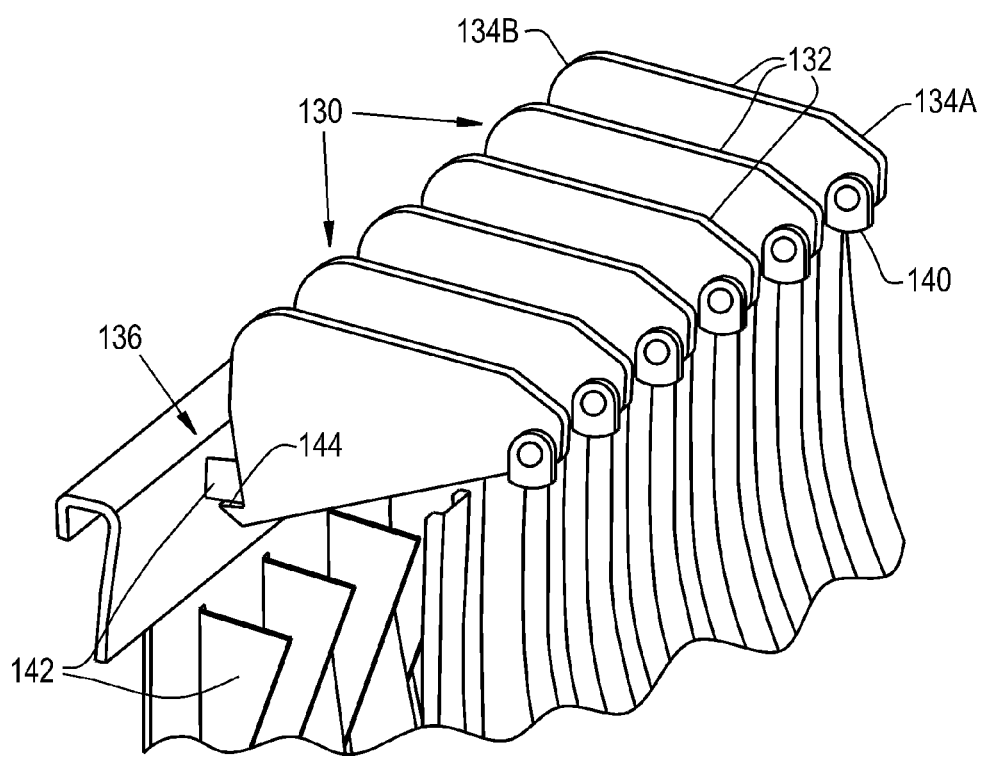
FIG. 10 is a perspective view of the plunger cleaner shown in FIG. 9.
Figure 11:
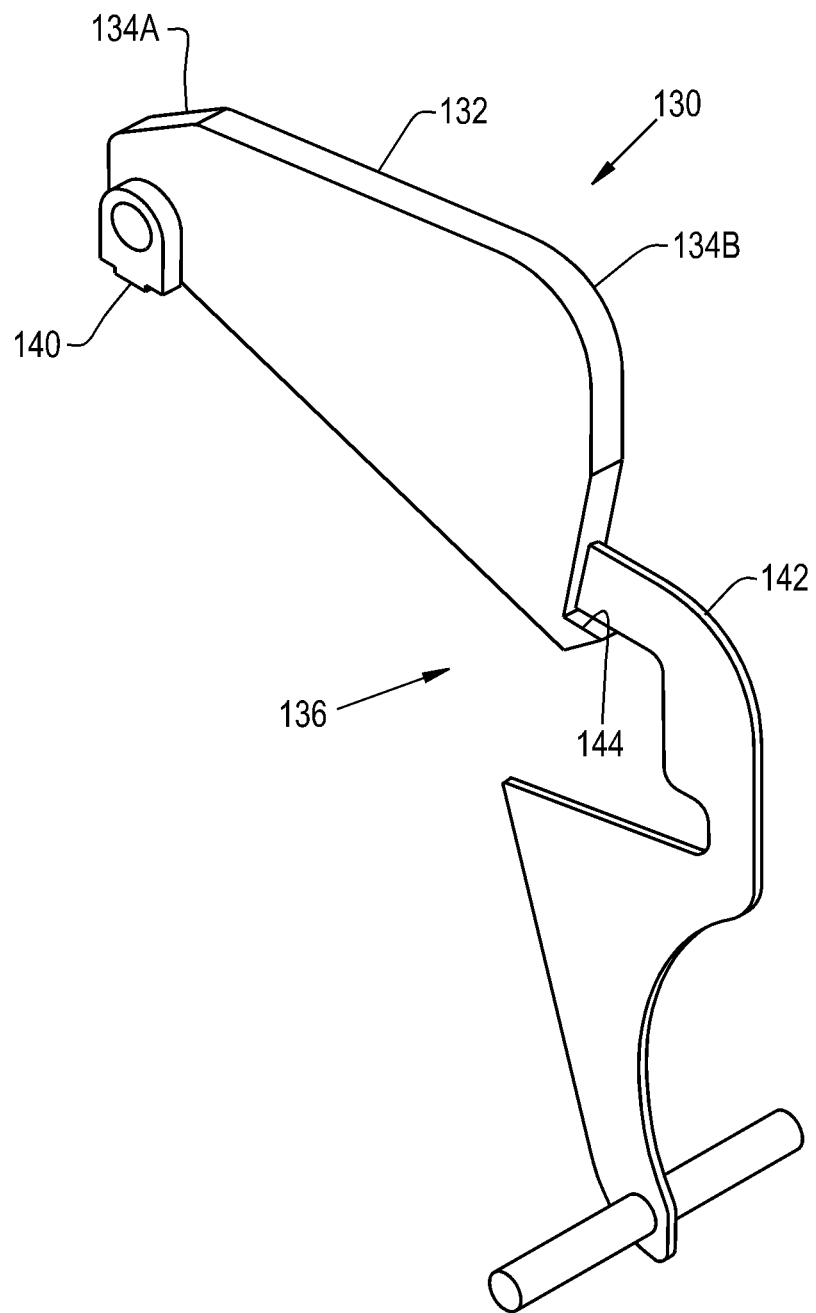
FIG. 11 is a perspective view of a cleaning element and latch arrangement in the plunger cleaner shown in FIGS. 10 and 11.

Referring now to FIGS. 9-11, there is shown another embodiment of a plunger cleaner 130 of the present invention which provides the dual functionality as described above with reference to plunger cleaners 70, 90 and 110. Similar to plunger cleaners 90 and 110, plunger cleaner 130 includes a plurality of generally trapezoidal shaped cleaning elements 132. However, each of the cleaning elements 132 has a beveled corner 134A and rounded corner 134B, and a latch arrangement 136 which selectively latches the plunger cleaner in the second orientation.

The plurality of cleaning elements 132 are independently mounted to the floor 78 (or other frame structure) intermittently along an edge 138 of the pre-compression chamber outlet 74, whereby movement of the plurality of cleaning elements 132 is independent from each other. In the embodiment shown, a number of brackets 140 are mounted to the floor 78, and each cleaning element 132 is pivotally mounted to a respective bracket 140.

The latch arrangement 136 includes plurality of hooks 142 arranged along one side of the pre-compression chamber 22, and each of the plurality of cleaning elements 132 includes a mating surface 144 which mates with a corresponding one of the plurality of hooks 142. The plurality of hooks 142 are movable between an unhooked position when the plurality of cleaning elements 132 are in the first orientation, and a hooked position when the plurality of cleaning elements 132 are in the second orientation (shown in FIGS. 9-11). The hooks 142 can be moved between the latched and unlatched positions by using a mechanism (not shown) tied to movement of the stuffer arrangement, and thus movable with the movement of the stuffer arrangement. Alternatively, the hooks 142 can be moved with an independently movable actuator, such as a hydraulic motor, gear, etc. (not shown), based on, e.g., a sensed position of one of more components within the baler 10, such as the position of the plunger 30, stuffer forks 28, etc. As yet another alternative, the hooks 142 can be moved against a spring load. As the pre-compression chamber fills up, the crop pressure increases, as does the load on the hooks 142. If the crop pressure load is greater than the spring load, then the hooks 142 will unlatch automatically.

Figure 12:
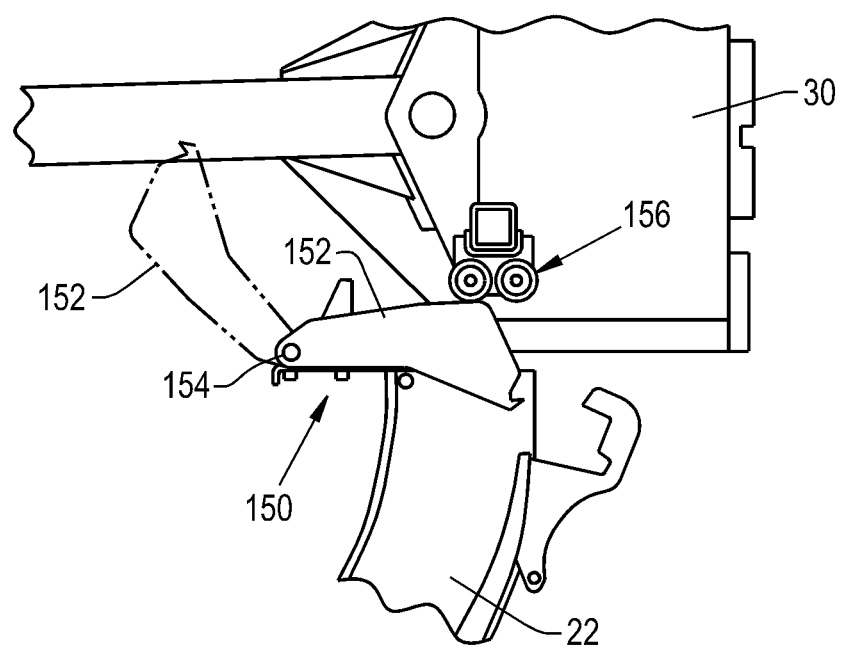
FIG. 12 is a partial side view illustrating another embodiment of a plunger cleaner of the present invention.

FIG. 12 illustrates another embodiment of a plunger cleaner 150 of the present invention. Plunger cleaner 150 has a number of cleaning elements 152 which are mounted on a common shaft 154, with the cleaning elements 152 having a different shape than the other cleaning elements described above. The cleaning elements 152 are shown in both the open (first) orientation (shown in phantom), and the closed (second) orientation closing the outlet 74 of the pre-compression chamber 22. The cleaning elements 152 are independently mounted on the shaft 154, and movable to the closed orientation using the roller arrangements 156, and movable to the open orientation using a spring assist or other positive action assist (not shown).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
a pre-compression chamber having an outlet;
a main bale chamber adapted to receive crop from the pre-compression chamber;
a plunger reciprocally disposed within the main bale chamber, the plunger including a plurality of plunger slots which are structured and arranged to allow a plurality of needles to intermittently pass therethrough;
a stuffer unit comprising stuffer forks for thrusting a wad of crop in front of the plunger; and
a plunger cleaner spaced from the stuffer unit, the plunger cleaner structured and arranged to:
clean the plurality of plunger slots; and
open and close the outlet of the pre-compression chamber during movement of the plunger.

2. The agricultural baler of claim 1, wherein the plunger cleaner is movable between two orientations, including:
a first orientation wherein the plunger cleaner cleans the plurality of plunger slots and opens the outlet of the pre-compression chamber; and
a second orientation wherein the plunger cleaner cleans the plurality of plunger slots and closes the outlet of the pre-compression chamber.

3. The agricultural baler of claim 2, wherein movement of the plunger cleaner between the first orientation and the second orientation, or vice versa, is used to activate an additional component or system on the baler.

4. The agricultural baler of claim 2, wherein the plunger cleaner is pivotally mounted adjacent to a floor of the main bale chamber adjacent to the outlet of the pre-compression chamber, the plunger cleaner being pivotally movable between the first orientation and the second orientation.

5. The agricultural baler of claim 4, wherein the plunger cleaner includes a plurality of cleaning elements mounted intermittently along an edge of the outlet of the pre-compression chamber, each of the plurality of cleaning elements being associated with a respective one of the plurality of plunger slots.

6. The agricultural baler of claim 5, wherein each of the plurality of cleaning elements is independently pivotally mounted to the floor of the main bale chamber, and movement of the plurality of cleaning elements is independent from each other.

7. The agricultural baler of claim 5, wherein movement of the plunger within the main bale chamber causes movement of the plurality of cleaning elements between a first elements orientation wherein the plurality of cleaning elements cleans the plurality of plunger slots and opens the outlet of the pre-compression chamber and a second elements orientation wherein the plurality of cleaning elements cleans the plurality of plunger slots and closes the outlet of the pre-compression chamber, or vice versa.

8. The agricultural baler of claim 7, wherein the plunger further includes at least one roller positioned within each of the plurality of plunger slots, the roller of each of the plurality of plunger slots engaging a corresponding one of the plurality of cleaning elements upon reciprocating movement of the plunger.

9. The agricultural baler of claim 7, further comprising a latch arrangement which selectively latches the plunger cleaner in the second orientation.

10. The agricultural baler of claim 9, wherein the latch arrangement includes a plurality of hooks arranged alongside of the pre-compression chamber, and each of the plurality of cleaning elements includes a mating surface which mates with a corresponding one of the plurality of hooks, wherein the plurality of hooks are movable between an unhooked position when the plurality of cleaning elements are in the first elements orientation, and a hooked position when the plurality of cleaning elements are in the second elements orientation.

11. The agricultural baler of claim 7, wherein the plurality of cleaning elements clean the plurality of plunger slots when the plurality of cleaning elements are in either the first elements orientation or the second elements orientation.

12. The agricultural baler of claim 4, wherein the plunger cleaner includes a plurality of cleaning elements mounted intermittently along a common shaft, the shaft being pivotally mounted adjacent to the floor of the main bale chamber.

13. The agricultural baler of claim 12, wherein each of the plurality of cleaning elements are trapezoidal-shaped cleaning elements.

14. The agricultural baler of claim 1, wherein the baler is a large square baler.

15. The agricultural baler of claim 1, wherein the plunger cleaner is further structured and arranged to provide an additional functionality of determining a crop pressure within the pre-compression chamber.

* * * * *